(No Model.) 2 Sheets—Sheet 1.
S. A. DONNELLY.
BICYCLE.
No. 553,453. Patented Jan. 21, 1896.
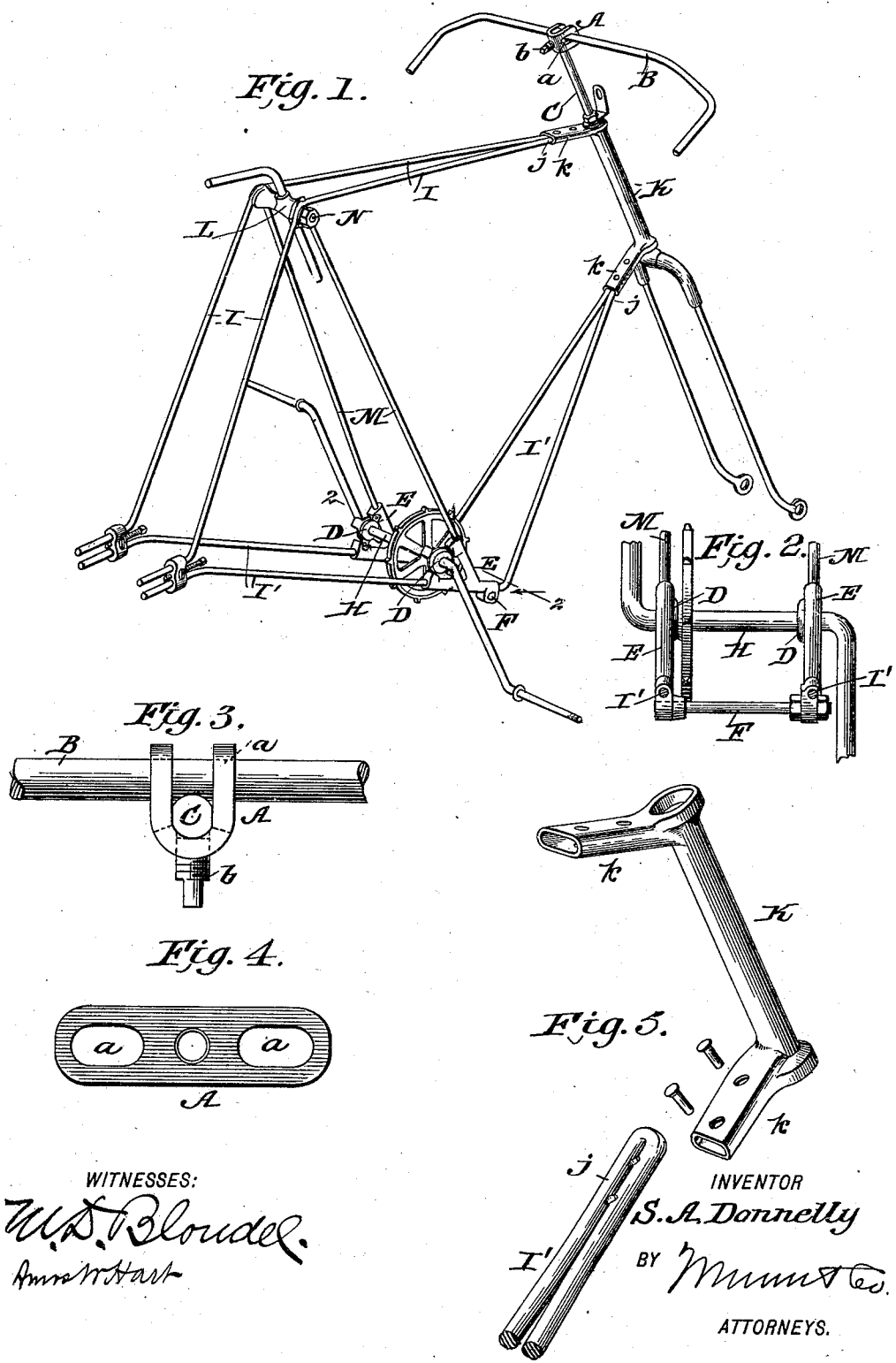
WITNESSES:
INVENTOR
S. A. Donnelly
BY Munn & Co.
ATTORNEYS.

(No Model.) 2 Sheets—Sheet 2.
S. A. DONNELLY.
BICYCLE.
No. 553,453. Patented Jan. 21, 1896.
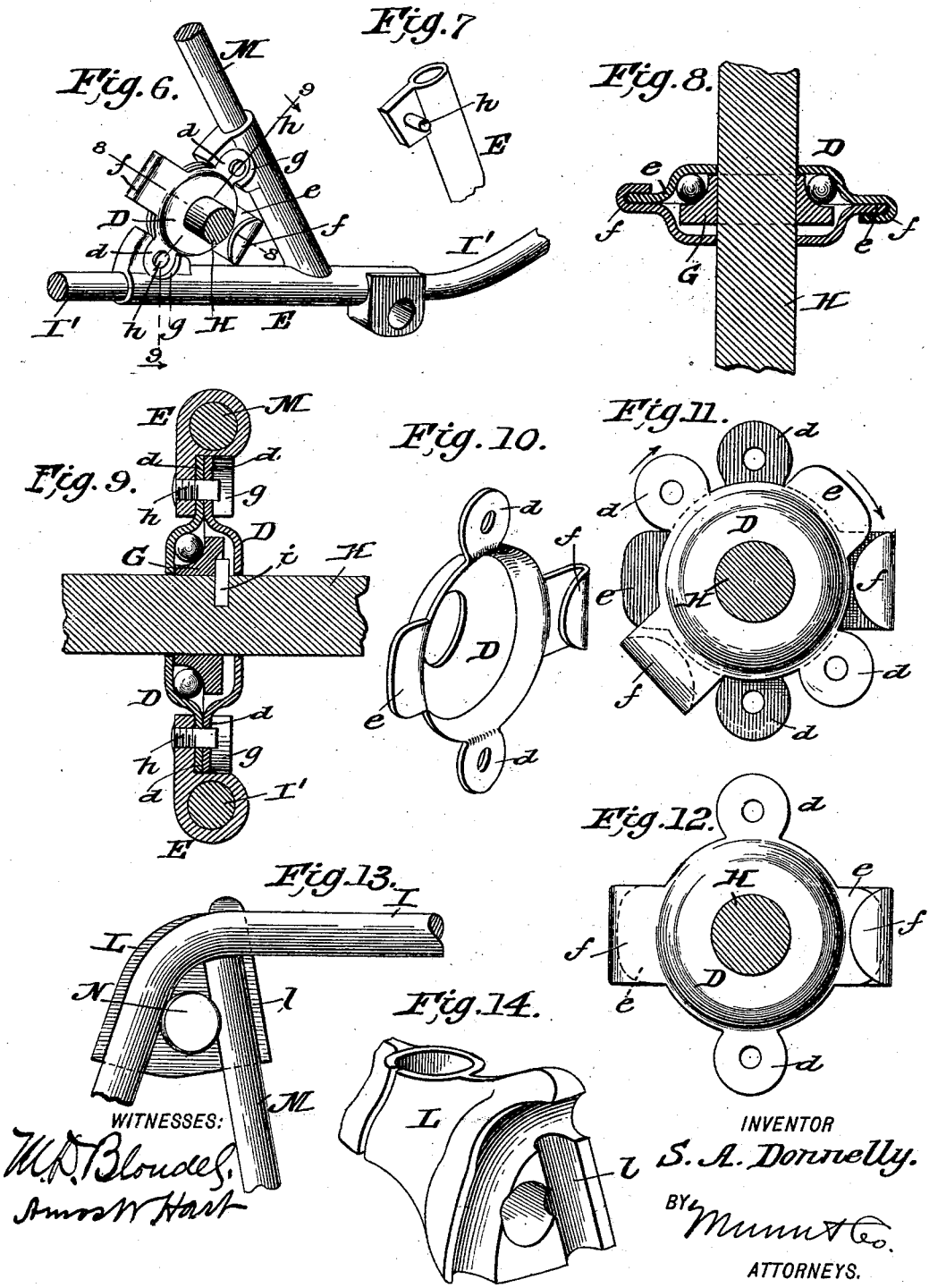
WITNESSES:
INVENTOR
S. A. Donnelly.
BY
Munn & Co.
ATTORNEYS.

UNITED STATES PATENT OFFICE.

SAMUEL A. DONNELLY, OF CHICAGO, ILLINOIS, ASSIGNOR OF ONE-HALF TO PETER DEWARD, OF SAME PLACE.

BICYCLE.

SPECIFICATION forming part of Letters Patent No. 553,453, dated January 21, 1896.

Application filed April 24, 1895. Serial No. 546,996. (No model.)

*To all whom it may concern:*

Be it known that I, SAMUEL A. DONNELLY, of Chicago, in the county of Cook and State of Illinois, have invented a new and useful Improvement in Bicycles, of which the following is a specification.

My present invention is an improvement upon that for which I have received Letters Patent No. 506,105, dated October 31, 1893. The novel features constituting the improvement are as hereinafter set forth.

In the accompanying drawings, Figure 1 is a perspective view of a bicycle-frame and attachments embodying my invention. Fig. 2 is a section on line 2 2 of Fig. 1. Fig. 3 is a top plan view of the handle-bar and clip attachment. Fig. 4 is a plan view of the handle-bar clip or clamp extended in the flat. Fig. 5 is a perspective view of the tubular head of the machine and a portion of the "diamond-frame" adapted for connection therewith. Fig. 6, Sheet 2, is a perspective view of the axle-bearings and Y-fittings in which they are held, together with a portion of the diamond-frame. Fig. 7 is a perspective view of a portion of one of the Y-fittings, showing a modification. Fig. 8 is an enlarged section on line 8 8 of Fig. 7. Fig. 9 is an enlarged section on line 9 9 of Fig. 7. Fig. 10 is a perspective view of one of the two like parts comprising the casing for the axle-bearing. Fig. 11 is a view showing the two like parts of the casing for the axle-bearing in disengaged position. Fig. 12 is a view showing the said parts of casing engaged or locked. Fig. 13 is an end view of the saddle-block and connected portion of the diamond-frame, the clamping-nut being detached. Fig. 14 is a perspective view of a portion of such saddle-block.

A U-shaped clip A, Figs. 1 and 2, and a clamp-screw $b$ serve to secure the handle-bar B to the steering-head adjustably. The ends of said clip are provided with lengthwise slots $a$, through which the handle-bar B may be inserted. The screw $b$ screws through a threaded hole in the bend of the clip A.

My invention relates in part to the boxes or casings D, Figs. 1, 6, and 12, which inclose the ball-bearings of the machine. The same are made of two parts, Figs. 10 and 11, which are of like construction and adapted to interlock, as will be further explained. Each such half of the casing has on its periphery two opposite perforated radial ears $d\,d$, and also a radial rounded lug $e$ and inturned lip or flanged $f$, which lug and lip are also arranged oppositely. It is apparent that when such halves of the casing D are placed with their inner flat rims or faces together and with their respective perforated ears $d\,d$ out of coincidence, as shown in Fig. 7, and are then turned a short distance one on the other, the ears $d\,d$ will be brought into coincidence and the lugs $e$ enter and engage the lips or flanges $f$, as shown in Fig. 12. Thus the halves or two like parts of the casing are interlocked or held together without the aid of clamp-screws or other supplemental fastenings.

Another improvement consists in the means for holding these interlocking parts of the casing D in the required engagement and securing them in rigid connection with the Y-shaped fittings E, constituting attachments of the lower portion of the diamond or truss frame of the machine. As shown in Figs. 6 and 9, these fittings E are provided on their inner sides with circular sockets $g$ for securing the corresponding ears $d$ of the casings D, and in the center of such sockets is arranged a pin $h$, which passes through the holes in said lugs, Fig. 9. These pins $h$ not only prevent the two parts of the casing D from rotating on each other and thus hold them rigidly interlocked, but also prevent any lateral motion or wabbling of the casings as a whole. Hence I propose in some cases to dispense with the ear-sockets $g$ and employ the pins $h$ alone for holding the casings in due position. (See Fig. 7.) Said pins $h$ will preferably be made of wrought iron or steel, and may be riveted or otherwise held in place in the fittings E. The latter are held duly spaced and rigidly parallel by means of a transverse screw-bolt F, as in my former invention, Fig. 2.

The cones G within the casing D, Fig. 9, are backed up or supported against lateral thrust by one or more small radial pins $i$, which are driven into sockets in the crank-axle H on the inner side of the cones G, as shown. The pins form a simple but effective means for holding the cones rigidly in place and enabling them to support lateral thrust.

In my former invention the rods comprising the diamond-shaped frame proper of the bicycle were in six parts; but by the improvements hereinafter described they are reduced to four parts and the strength, rigidity and durability of the frame likewise materially increased, while the several parts may be more easily and quickly assembled or taken apart.

In the present invention the upper bifurcated truss member, I, is made in one piece—i. e., of one rod—and the lower truss member, I', likewise formed of one piece or rod, as represented in Figs. 1 and 9—that is to say, a rod is bent or doubled at its middle to form each of the respective trusses I and I'. The portions thus bent or doubled constitute the forward ends $j$ of said trusses and fit in sockets formed in the respective arms $k$ of the tubular head K of the machine. They are held rigidly but detachably in said sockets by means of screws that pass through holes formed by coincident grooves in the doubled ends $j$, Fig. 5.

Instead of the cleft or slotted saddle-block L being located forward of the angle of the upper truss-rods I, as before, it is placed at or in such angle, Fig. 1, and the said rods fit in angular instead of straight grooves formed in the ends of such head. By this change in construction and arrangement the saddle-block L is held more firmly in place and the frame rendered more rigid, while the ornamental appearance of the latter is enhanced. A further change and advantage lies in providing the saddle-block L with nearly vertical grooves $l$, Figs. 13 and 14, to receive the upper ends of the upright stay rods or braces M, which are made straight instead of being bent at a right angle, as in the previous machine. The ends of such stay-rods M preferably abut the under sides of the upper truss I, and one bolt N serves to clamp and secure all the aforementioned parts of the frame as well as to clamp the saddle-post in any required vertical adjustment in the block L.

What I claim is—

1. In a bicycle, a box or casing for the bearings, which consists of two parts each having a radial peripheral lug or projection and opposite inturned lip or flange, which latter is adapted to receive and engage with the lug of the other part, as shown and described.

2. In a bicycle, the combination with frame attachments or fittings having inner sockets and pins set therein, of the bearing casings composed of two concave parts having perforated radial ears provided with holes as specified, and also having radial lugs and inturned flanges which engage or interlock when said ears are brought into coincidence, as shown and described.

3. In a bicycle, the combination with the lower frame member, of the upper angular truss member composed of rods as shown, a block arranged at the angle of such upper member and having angular grooves for receiving the same, the transverse stay rods whose upper ends enter grooves or sockets in said block, and a bolt for clamping all the aforesaid parts together, as specified.

4. In a bicycle, the improved "diamond" or truss frame composed of upper and lower bifurcated truss members each formed of a single rod bent or doubled at its middle, the head having arms provided with sockets for receiving the doubled ends of said members, the saddle block arranged at the angle of the upper member and having angular grooves in its ends to receive the same, the straight transverse stay rods whose upper ends enter sockets in said block, and a bolt which clamps the latter to the parts in contact with it as specified.

SAMUEL A. DONNELLY.

Witnesses:
CHRISTIAN F. WIEHE,
PETER DE WARD.